United States Patent
Nicolai et al.

(10) Patent No.: US 7,279,214 B2
(45) Date of Patent: Oct. 9, 2007

(54) FLOOR COVERING HAVING A STRONG NOISE-REDUCING PROPERTIES

(75) Inventors: Norbert Nicolai, Schermbeck (DE); Volkmar Schulze, Schierling (DE)

(73) Assignees: EEEA Entwicklungsgesellschaft fur Akustik mbH, Witten (DE); HP-Chemie Pelzer Research and Development Ltd., Waterford (IE)

( * ) Notice: Subject to any disclaimer, the term of this patent is extended or adjusted under 35 U.S.C. 154(b) by 144 days.

(21) Appl. No.: 10/363,981

(22) PCT Filed: Sep. 1, 2001

(86) PCT No.: PCT/EP01/10101

§ 371 (c)(1),
(2), (4) Date: Aug. 8, 2003

(87) PCT Pub. No.: WO02/20307

PCT Pub. Date: Mar. 14, 2002

(65) Prior Publication Data

US 2004/0037995 A1   Feb. 26, 2004

(30) Foreign Application Priority Data

Sep. 9, 2000 (DE) ................ 100 44 761
Feb. 17, 2001 (DE) ................ 101 01 819

(51) Int. Cl.
*B60N 3/04* (2006.01)
*B60R 13/08* (2006.01)
*G10K 11/16* (2006.01)

(52) U.S. Cl. ............. 428/137; 428/131; 428/457; 428/537.1; 181/292; 181/290; 181/284

(58) Field of Classification Search ......... 428/95, 428/90, 137, 457, 473, 537.1, 131, 138; 181/292, 181/290, 284, 175
See application file for complete search history.

(56) References Cited

U.S. PATENT DOCUMENTS

| | | | |
|---|---|---|---|
| 4,256,797 A * | 3/1981 | Stamper et al. | 428/215 |
| 5,266,143 A | 11/1993 | Albera et al. | |
| 5,554,830 A * | 9/1996 | Muller et al. | 181/290 |
| 5,892,187 A * | 4/1999 | Patrick | 181/286 |
| 6,146,564 A * | 11/2000 | Beckmann | 264/46.5 |

(Continued)

FOREIGN PATENT DOCUMENTS

DE   2611855 A * 9/1977

(Continued)

OTHER PUBLICATIONS

Definitionen Von "Folie" Im Deutschen Normenwerk, Nov. 14, 2003.

*Primary Examiner*—Cheryl A. Juska
(74) *Attorney, Agent, or Firm*—Venable LLP; Thomas G. Wiseman

(57) ABSTRACT

A floor covering characterized as having a strong noise-reducing properties for the interior trim of means of transport. The floor covering has, on the passenger side, a textile or non-textile surface, acoustically coupled through at least one microperforated sheet to a fibrous non-woven and/or foamed plastic. A microperforated sheet having a hole diameter from 0.2 to 0.5 mm and an interhole distance from 3 to 7 mm.

2 Claims, 1 Drawing Sheet

U.S. PATENT DOCUMENTS

| | | | | |
|---|---|---|---|---|
| 6,161,889 | A * | 12/2000 | Davis et al. | 296/39.1 |
| 6,598,701 | B1 * | 7/2003 | Wood et al. | 181/290 |
| 6,617,002 | B2 * | 9/2003 | Wood | 428/131 |
| 6,820,720 | B1 * | 11/2004 | Nicolai et al. | 181/292 |
| 6,977,109 | B1 * | 12/2005 | Wood | 428/131 |
| 2001/0050197 | A1 * | 12/2001 | Wood | 181/292 |

FOREIGN PATENT DOCUMENTS

| | | |
|---|---|---|
| DE | 39 05 607 A1 | 8/1990 |
| DE | 92 00 439.3 U1 | 5/1992 |
| DE | 4204831 A1 * | 8/1992 |
| DE | 41 23 593 C2 | 3/1995 |
| DE | 295 07 971 U1 | 1/1996 |
| DE | 197 54 107 C1 | 2/1999 |
| DE | 299 15 248 U1 | 10/2000 |
| DE | 299 15 428 U1 | 10/2000 |
| EP | 0 897 175 A2 | 2/1999 |
| EP | 1 161 360 B1 | 7/2002 |
| EP | 0 889 459 B1 | 9/2003 |
| JP | 2000034937 A * | 2/2000 |
| WO | WO92/01587 A1 | 2/1992 |
| WO | WO9201587 A1 * | 2/1992 |
| WO | WO 0005707 A1 * | 2/2000 |

* cited by examiner

FLOOR COVERING HAVING A STRONG NOISE-REDUCING PROPERTIES

BACKGROUND OF THE INVENTION

1. Field of the Invention

The present invention relates to a floor covering with a strong noise-reducing effect for the interior trim of means of transport.

2. Description of the Related Art

In DE 197 54 107 C1 and the prior art cited therein, which is incorporated herein by reference, the absorption behavior of microperforated building elements is examined. In the specification mentioned, baffle structures composed of layers of microperforated sheets which are pending from a ceiling or a roof as so-called compact absorbers are examined. The microperforated sheets are suitable for very efficiently absorbing from the space sound waves impinging on one or both sides normally, at an angle or in a grazing manner, especially at higher frequencies.

Further, structures are known in which a sound-impermeable surface is provided with perforations to achieve an absorptive effect of the underlying absorber, see, for example, DE 30 18 0172 A, DE 41 23 593 A and WO 92/01587.

DE 295 07 971 U1 relates to a floor damping system for automobiles having a porous carpet floor structure, without stating hole sizes.

DE 299 15 428 U1 relates to a sound screening element for protection from sound propagation from the noise area of, in particular, motor vehicles and other machines and devices using a layer having a multitude of openings, characterized in that the layer is formed as a self-supporting sound-protection molded part and has a hole area ratio (LV) of between 0.001 and 20% at a thickness (d) of the molded part of between 0.02 and 50 mm and an average width (b) or an average diameter (D) through openings of between 0.001 and 2 mm.

DE 92 00 439 U1 relates to a non-crush rigid molded part, especially for the floor area in the passenger compartment of automobiles, which has a substructure layer which is stable under load and made of a rot-resistant first plastic material and a decorative layer provided towards the viewing side over said substructure layer and made of a second plastic material or natural material and optionally one or more sealing layers provided between said substructure layer and decorative layer and/or on the backside of said substructure layer and made of further plastic materials, wherein all the layers are laminated to form a multilayer structure. The molded part is characterized in that said substructure layer has a fibrous component and a thermoplastic binder component distributed therein whose proportion is suitable for producing the required stiffness of the molded part.

DE 39 05 607 A1 describes a layer structure for the preparation of sound insulations and a method for their preparation. For this purpose, the acoustically effective layer consists of a thermodeformable absorbing plastic which can be processed into a foam and/or at least one layer consisting of a non-woven. The layer structure and the sound insulation produced with it can be employed, in particular, for the floor covering of motor vehicles.

The floor coverings employed in the automobile field integrate different functions which must be considered in the preparation: aesthetic demands (surface appearance, pleasant feel), leveling of surface contours of the body, acoustic functions (damping, absorption and insulation), optimum use properties (minimum wear, high crush resistance, good cleanability, high light resistance), foam-integrating of additional structural parts (attachment of floor mats, parts for increasing crush resistance), openings for rear heating and for wire troughs, application by welding of crush protector and foot rest. In these considerations, suitability for process also is to be ensured: extreme deep-drawability without loss of functionality, through-foaming resistance of the material structure, recyclability. In recent times, the emission behavior is hugely gaining importance. Thus, the material structure of a floor covering in the automobile field which is usual today is as follows:

Pile/tufting support/bonding/backing adhesive/heavy sheet/cover fleece/soft foam. In middle class and luxury class vehicles, tufting velours qualities are employed, and in compact class vehicles, flat-needle webs and dilours qualities. Also, flocked, knitted, machine-knitted and woven materials as well as malivlies are found here. As a coating, latex and polyolefins (especially PE) as well as thermoformable non-woven constructions are employed. Instead of a PUR soft foam (with specific gravities of $\geq 60$ kg/m$^3$), loosely compressed textile fibrous non-wovens with thermoset or thermoplastic bonding as well as combinations of foam or non-woven layers having different flow resistances are also employed. The sound absorption property of the floor covering can be increased when a porous layer which is open to air and thus to sound is inserted between the actual top web and the process-caused sealing layer or heavy sheet. As the porous layer which is open to air and thus to sound (absorption layer), polyester and mixed fiber non-wovens are employed here; to prevent the entry of water into the material structure of the floor covering, the latter is furnished with a hydrophobic property. The sealing sheet which is often employed in addition to the heavy sheet is supposed to prevent the breakthrough of foam in foam backing. For saving weight, today, the heavy sheet (the specific gravities are between 0.8 and 10 kg/m$^2$) is also in some cases completely dispensed with, depending on the engine and body designs, in which case only sealing sheets (multilayer sheets with specific gravities of between 0.04 and 0.35 kg/m$^2$) are employed.

It is disadvantageous in all known floor coverings that sound absorption is restricted solely to the surface and a thin sublayer and thus absorption can become effective only conditionally.

SUMMARY OF THE INVENTION

It is the object of the invention to provide a floor covering having a strong noise-reducing effect for the interior trim of means of transport which has, on the passenger side, a textile or non-textile surface, such as of plastic, rubber, metal or a natural substance, and thus allows an easy assembly.

According to the invention, this object is achieved by providing the surface of the floor covering with a sound-permeable design irrespective of its material and thus effecting a coupling to the floor covering sublayer which lays towards the body panel.

DESCRIPTION OF THE PREFERRED EMBODIMENTS

Figure 1:
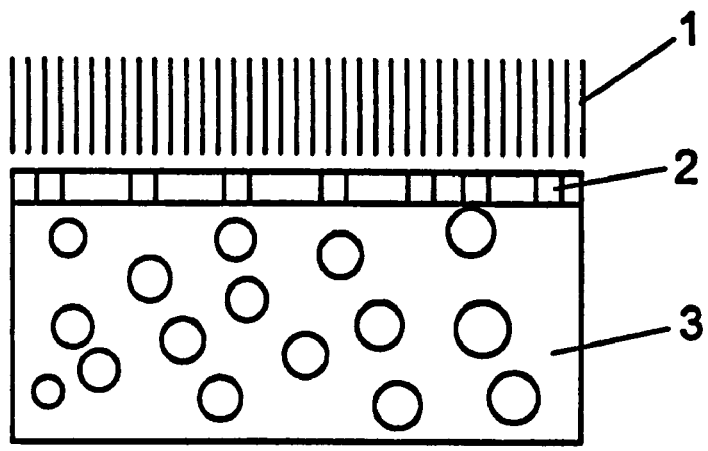
FIG. 1 shows a floor covering having a textile top web connected to a non-woven or foam backing through a microperforated layer.

The floor coverings according to the invention have, especially on the passenger side, a textile or non-textile surface, such as plastic, rubber, metal or a natural substance, which is preferably acoustically coupled through at least one microperforated sheet to a floor covering sublayer made of a fibrous non-woven and/or foamed plastic. The microperforated sheet adopts the function of 1) a heavy layer in the mass-spring system and 2) an absorber.

To achieve a defined absorption, in a preferred embodiment, the sound permeability is achieved by an air-permeable bonding of the fibers in carpets and/or by a microperforation of the topmost material layer in closed surfaces and/or further layers in the structure of the floor covering.

Depending on the design of the floor covering, the side facing the interior may have a structure as follows:
a) a textile carpet surface consisting of a
   tufted carpet;
   or a needle-punched carpet with different needling.

To achieve the air permeability and the associated acoustic coupling, the type of fiber bonding is selected to form a microporous structure.
b) a textile carpet surface provided with a thick plastic layer on the backside;
c) a flocked carpet on a textile or polymer substrate;
d) a polymeric surface having a one-layer or two-layer structure, such as a TPO-coated heavy layer;
e) a metallic surface, such as a stainless steel or aluminum sheet with different surface profiles; or
f) an organic surface, such as wood or cork;
g) leather or artificial leather.

For the structures mentioned under b) to g), the desired sound permeability is achieved by a microperforation.

The microperforation has such a design that, due to the hole diameter, the interhole distance and the given or realized distance from the body panel and the thickness of the material, a strong acoustic effect is achieved by the microperforation, especially for low frequencies (<350 to 550 Hz). By the coupling to the floor covering sublayers, absorption in a high frequency range is achieved.

In addition, the hole diameters should be selected so large that plain water (water without altered surface tension) does not permeate the layer without additional action. Further, the surface of the floor covering sublayer can be furnished with a hydrophobic property so that a further water barrier exists.

Especially when only one hole layer is present, the hole diameters are from 0.2 to 0.5 mm, preferably from 0.3 to 0.4 mm, and the hole distance is from 3 to 7 mm, preferably from 3.5 to 5.5 mm. Of course, it is possible, when several microperforated layers are present, to design them with different or equal hole area fractions. The holes can be made in the layer with any geometry by methods per se known in the prior art, for example, by punching with piercing or needle rollers or laser irradiation.

When the hole area fraction is selected too low, a sound-absorbing effect is not or not sufficiently produced, while on the other hand, when the hole area fraction is selected too high, the sound-absorbing effect of the microperforated absorber is again reduced. In addition, accordingly prepared trim or molded elements in the vehicle field are weakened mechanically.

The surface layers of the materials mentioned under b) to g) simultaneously serve as a heavy layer in the mass-spring system.

Due to the rigid structure, this surface layer additionally adopts the function of stabilizing the structure of the floor covering.

The carpet floor structure according to the invention can be bonded to a foam and/or non-woven absorber which is lying beneath towards the body panel, for example, by adhesive bonding, needle-bonding or direct foam backing, and or it may also lie loosely on top thereof.

In the following, the present invention will be further illustrated by some Examples.

In FIG. 1, a floor covering prepared according to the invention and having a strong noise-reducing effect is described.

The textile top web 1, which consists, for example, of a needle web or a tufting, is connected to a usual non-woven or foam backing 3 through a microperforated heavy layer 2.

Figure 2:
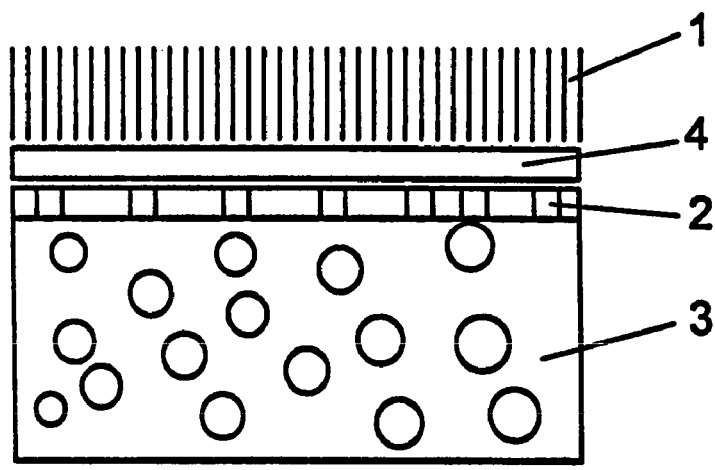
FIG. 2 shows a floor covering embodiment where a sublayer web is interposed between the textile top web and the microperforated layer, which microperforated layer is connected to a non-woven or foam backing.

FIG. 2 also describes a floor covering prepared according to the invention in which the textile top web 1 may be, for example, a needle web or tufting. This is additionally applied to a sublayer web 4 which is coupled to a usual non-woven or foam backing 3 through a microperforated separation sheet, for example, a heavy layer 2 or sealing sheet.

Figure 3:
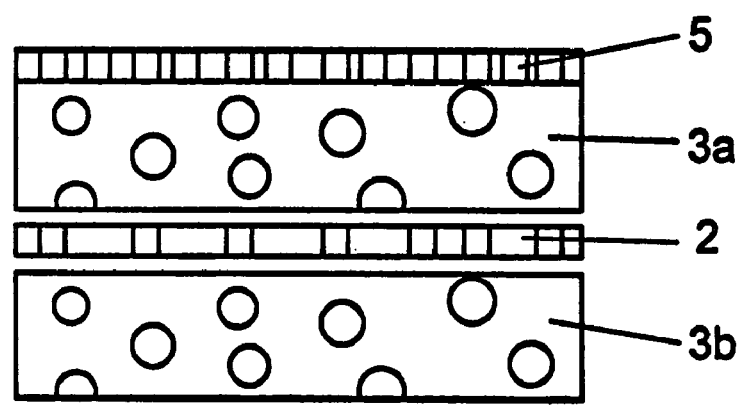
FIG. 3 shows a another floor covering embodiment where a a microperforated floor surface is connected through a first non-woven or foam absorber system and a microperforated sheet to a non-woven or foam layer.

In FIG. 3, another variation of the floor coverings according to the invention is shown. The microperforated useful floor surface 5, for example, made of a thermoplastic polyolefin sheet (TPO), is connected through a first non-woven or foam absorber system 3a and a microperforated separation sheet, for example, a heavy layer 2 or sealing sheet, to a non-woven or foam layer 3b provided on the backside.

The invention claimed is:

1. A floor covering for the interior trim of a means of transport, comprising a non-textile surface and a sublayer of a nonwoven fabric and/or foam, wherein the surface and the sublayer are coupled by at least one microperforated sheet having a hole diameter of the microperforated layer of from 0.2 to 0.5 mm and an interhole distance of the microperforated layer of from 3 to 7 mm, wherein the surface consists of a metallic microperforated surface, which metallic microperforated surface consists of stainless steel or aluminum.

2. A floor covering for the interior trim of a means of transport, comprising a non-textile surface and a sublayer of a nonwoven fabric and/or foam, wherein the surface and the sublayer are coupled by at least one microperforated sheet having a hole diameter of the microperforated layer of from 0.2 to 0.5 mm and an interhole distance of the microperforated layer of from 3 to 7 mm, wherein the surface consists of an organic microperforated surface that consists of wood or cork.

* * * * *